United States Patent Office 3,348,939
Patented Oct. 24, 1967

---

3,348,939
PROCESS FOR KILLING GROWING PLANTS
Delta W. Gier, Parkville, Mo., assignor to Chemagro Corporation, New York, N.Y., a corporation of New York
No Drawing. Filed May 18, 1964, Ser. No. 368,348
6 Claims. (Cl. 71—79)

ABSTRACT OF THE DISCLOSURE

Acetylenic carbonates having the formula

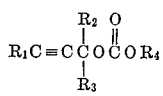

where $R_1$ is selected from the group consisting of hydrogen, lower alkyl, phenyl and tolyl; $R_2$ is selected from the group consisting of lower alkyl, lower alkenyl, phenyl, methylphenyl, and chlorophenyl; $R_3$ is selected from the group consisting of lower alkyl, phenyl, methylphenyl and chlorophenyl, and $R_4$ is selected from the group consisting of lower alkyl, lower alkenyl, aryl of the phenyl series, chlorophenyl, cyclohexyl, furfuryl and tetrahydrofurfuryl, are effective as herbicides.

---

The present invention relates to novel herbicides.

It is an object of the present invention to prepare novel post emergent herbicides.

Another object is to prepare post emergent herbicides which have selective activity whereby weeds can be killed without injuring agricultural crops.

A further object is to prepare a herbicide which will not effect cotton but which will kill other plants growing in a cotton patch.

An additional object is to prepare a herbicide having low mammalian toxicity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by applying a herbicidally effective amount of an acetylenic carbonate having the formula

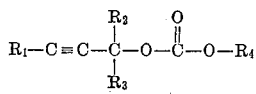

to growing plants. In the formula $R_1$ can be hydrogen, lower alkyl, e.g., methyl or ethyl or aryl, e.g., phenyl or tolyl, $R_2$ can be lower alkyl, e.g., methyl, ethyl, isobutyl, octyl, 2-ethyl hexyl, lower alkenyl, e.g. allyl, vinyl, hexenyl and octenyl, aryl, e.g., phenyl or tolyl or chloroaryl, e.g., chlorophenyl; $R_3$ can be lower alkyl, aryl or chloroaryl, e.g., chlorophenyl and $R_4$ can be alkyl, alkenyl, aryl, chloroaryl, cycloalkyl, furfuryl or tetrahydrofurfuryl. Preferably $R_1$ is hydrogen, $R_2$ and $R_3$ are lower alkyl and $R_4$ is alkyl or aryl.

The compounds employed in the present invention as post emergent herbicides can be prepared by reacting an acetylenic hydrocarbon containing the appropriate ketone with sodium-potassium alloy to prepare an alcoholate having the formula

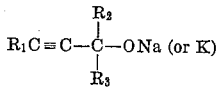

This alcoholate is then reacted with a chloroformate of the formula

to form the herbicide.

As the acetylenic hydrocarbon there can be used acetylene, methyl acetylene, phenyl acetylene or ethyl acetylene. As the ketone there can be used acetone, methyl ethyl ketone, diethyl ketone, methyl isobutyl ketone, acetophenone, benzophenone, methyl vinyl ketone, methyl 4-methylphenyl ketone. As the chloroformate there can be used methyl chloroformate, ethyl chloroformate, isobutyl chloroformate, 2-ethyl hexyl chloroformate, sec. butyl chloroformate, phenyl chloroformate, p-chlorophenyl chloroformate, furfuryl chloroformate, tetrahydrofurfuryl chloroformate, o-methylphenyl chloroformate, p-methylphenyl chloroformate, cyclohexyl chloroformate.

The acetylenic carbonates can also be prepared by reacting the appropriate alkyl alkenyl ethinyl carbinol or dialkyl ethinyl carbinol with a chloroformate as shown in Bavley Patents 2,791,602 and 2,791,603.

Illustrative of compounds which can be used as herbicides according to the present invention are methyl-1,1-dimethyl prop-2-yne-1-yl carbonate;
ethyl-1,1-dimethyl prop-2-yne-1-yl carbonate;
n-propyl-1,1-dimethyl prop-2-yne-1-yl carbonate;
isopropyl-1,1-dimethyl prop-2-yne-1-yl carbonate;
butyl-1,1-dimethyl prop-2-yne-1-yl carbonate;
isobutyl-1,1-dimethyl prop-2-yne-1-yl carbonate;
allyl-1,1-dimethyl prop-2-yne-1-yl carbonate;
amyl-1,1-dimethyl prop-2-yne-1-yl carbonate;
2'-ethylhexyl-1,1-dimethyl prop-2-yne-1-yl carbonate;
phenyl-1,1-dimethyl prop-2-yne-1-yl carbonate;
cyclohexyl-1,1-dimethyl prop-2-yne-1-yl carbonate;
p-tolyl-1,1-dimethyl prop-2-yne-1-yl carbonate;
m-tolyl-1,1-dimethyl prop-2-yne-1-yl carbonate;
o-chlorophenyl-1,1-dimethyl prop-2-yne-1-yl carbonate;
p-chlorophenyl-1,1-dimethyl prop-2-yne-1-yl carbonate;
tetrahydrofurfuryl-1,1-dimethyl prop-2-yne-1-yl carbonate;
furfuryl-1,1-dimethyl prop-2-yne-1-yl carbonate;
n-octyl-1,1-dimethyl prop-2-yne-1-yl carbonate;
n-amyl-1,1-dimethyl prop-2-yne-1-yl carbonate;
ethyl-1-methyl-1-ethyl prop-2-yne-1-yl carbonate;
isobutyl-1-methyl-1-ethyl prop-2-yne-1-yl carbonate;
phenyl-1-methyl-1-ethyl prop-2-yne-1-yl carbonate;
hexyl-1-methyl-1-ethyl prop-2-yne-yl carbonate;
methyl-1,1-diethyl prop-2-yne-1-yl carbonate;
butyl-1-diethyl prop-2-yne-1-yl carbonate;
phenyl-1,1-diethyl prop-2-yne-1-yl carbonate;
ethyl-1-methyl-1-isobutyl prop-2-yne-1-yl carbonate;
p-tolyl-1-methyl-1-isobutyl prop-2-yne-1-yl carbonate;
ethyl-1,1-diphenyl prop-2-yne-1-yl carbonate;
phenyl-1,1-diphenyl prop-2-yne-1-yl, methyl-1 methyl-1-phenyl prop-2-yne-1-yl carbonate;
butyl-1-methyl-1-phenyl prop-2-yne-1-yl carbonate;
ethyl-1-ethyl-1-phenyl prop-2-yne-1-yl carbonate;
isobutyl-1-ethyl-1-vinyl prop-2-yne-1-yl carbonate;
n-hexyl-1-isopropyl-1-hexenyl prop-2-yne-1-yl carbonate;
ethyl-1-methyl-1-allyl prop-2-yne-1-yl carbonate;
ethyl-1,1-dimethyl but-2-yne-1-yl carbonate;
isobutyl-1,1-dimethyl but-2-yne-1-yl carbonate;
phenyl-1,1-dimethyl but-2-yne-1-yl carbonate;
propyl-1,1-dimethyl but-2-yne-1-yl carbonate;

ethyl-1-methyl-1-ethyl but-2-yne-1-yl carbonate;
butyl-1-methyl-1-phenyl but-2-yne-1-yl carbonate;
methyl-1,1-dimethyl pent-2-yne-1-yl carbonate;
octyl-1,1-dimethyl pent-2-yne-1-yl carbonate;
ethyl-1,1-dimethyl-3-phenyl-prop-2-yne-1-yl carbonate;
phenyl-1,1-dimethyl-3-phenyl-prop-2-yne-1-yl carbonate.

The compounds of the present invention are useful as the sole toxic agent in post emergent herbicidal formulations or they can be used with other toxic agents.

The compounds of this invention can be made into herbicidal compositions for use in controlling growth of vegetation by mixing with a surface active dispersing agent with or without added solvent to aid in dispersing in water as a carrier for application to the soil, or with a solid dispersing agent which can itself act as a carrier. Dispersions containing a surface active agent have the advantage of spreading the herbicide substance more effectively over the soil area. The surface active agent can be anionic, cationic or nonionic in character.

Typical classes of suitable surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. When salts are employed they are usually sodium or potassium salts. Typical examples of such surface active agents include the sodium alkylbenzene sulfonates having 10 to 18 carbon atoms in the alkyl group, alkylphenol-ethylene oxide condensation products, e.g., p-isooctylphenol condensed with 10 ethylene oxide units, soaps, e.g., sodium stearate and potassium oleate, sodium salt of propylnaphthalene sulfonic acid, di (2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, sodium n-methyl-n-oleyl taurate, Turkey red oil, sodium dibutyl naphthalene sulfonate, sodium lignin sulfonate, polyethylene glycol stearate, decaglycerol tristearate, sodium dodecylbenzene sulfonate, tertiary dodecyl polyethylene glycol thioether (Nonionic 218), long chain ethylene oxide-propyleneoxide condensation products, e.g., Pluronic 61 (molecular weight 1000), sorbitan sesquioleate, polyethylene glycol ester of tall oil acids, sodium octyl phenoxyethoxyethyl sulfonate, tris (polyoxyethylene) sorbitan monostearate (Tween 60), sodium dihexyl sulfosuccinate.

Unless otherwise indicated all parts and percentages are by weight.

Example 1

The following general procedure was employed. Seven grams of sodium-potassium eutectic alloy (70% K–30% Na) were added to 300 ml. of toluene under an atmosphere of nitrogen in a reaction vessel. After stopping the introduction of nitrogen there was added acetylene gas from a cylinder containing acetylene dissolved in acetone. Some of the acetone was carried over. The reaction was continued until no visible suspended particles were noted and the mixture became translucent or colorless. This took 7–10 hours. The acetylide product was a mixture of

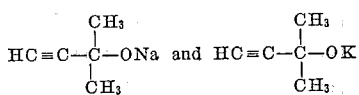

The theoretical amount of the appropriate chloroformate of the formula

was dissolved in 75 ml. of toluene, placed in a flask and cooled to −79° C. with Dry Ice-acetone. Then the acetylide was added to the chloroformate from a dropping funnel with stirring for 30 minutes at this temperature. The mixture was kept at −79° C. for five hours more and then was warmed to room temperature over ten hours. The stirring was stopped and the mixture allowed to stand.

The product was filtered at room temperature at the water pump, the residue washed twice with toluene and three times with ether. The washings were combined with the filtrate and the ether and toluene removed under vacuum. The properties of the products are shown in Table 1 for compounds having the formula

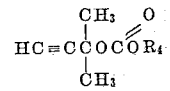

TABLE 1

| $R_4$ | M.P. (° C.) | B.P. (° C.) | B.P., 760 mm. (° C.) | Refractive Index (25° C.) | Sp. gr., 25° C./ 25° C. |
|---|---|---|---|---|---|
| Methyl | | 78.3 (36 mm.) | 155 | 1.4160 | 1.1324 |
| Ethyl | | | 167.5 | 1.4172 | 0.97875 |
| n-Propyl | | 63.8 (5 mm.) | 175 | 1.4202 | 0.9640 |
| Allyl | | 66.8 (5 mm.) | 188 | 1.4325 | 0.9872 |
| n-Butyl | | 70 (5 mm.) | 194 | 1.4234 | 0.9513 |
| Amyl | | 86 (5 mm.) | 204 | 1.4251 | 0.9410 |
| 2-ethylhexyl | | 108.3 (5 mm.) | decomposes | 1.43421 | 0.9160 |
| Phenyl | 48.5 | 122 (1 mm.) | | | |

Example 2

8.32 grams (0.231 mole) of sodium potassium alloy (30% Na, 70% K) were placed in 200 ml. of dry toluene in a container. The container was swept with nitrogen and then acetylene vapors containing acetone added. The mixture was cooled in an ice bath until reaction was complete after two and one-half hours. At this time the volume of the mixture had increased to 240 ml.

Next 21 grams (0.154 mole) of isobutyl chloroformate was placed in 150 ml. of toluene and mixture cooled in Dry Ice. There was slowly added two-thirds of the toluene-acetylide mixture, i.e., 160 ml. (or 0.154 mole of the acetylide). The mixture was allowed to warm to room temperature with stirring. The sodium chloride and potassium chloride were filtered off and the excess toluene stripped under vacuum. The isobutyl-1,1-dimethyl prop-2-yne-1-yl carbonate product boiled at 40–44° C. at 3 mm.

Example 3

Primary tests for post emergent herbicidal activity were carried out in the following manner. Oats, sugar beets, radish, flax and wheat seeds were planted in soil contained in flats measuring 14″ x 10″ x 3½″. Ten to 14 days after planting and the plants had emerged from the soil formulations and dilutions of the test chemicals were made and applied at rates of 20 and 5 pounds per acre of active ingredient to the plants growing in the flats.

The formulations consisted of preparing a two pound per gallon test chemical in a pre-mix with the following composition. The parts expressed by volume.

Eight parts of a mixture of mono, di- and tri-methylnaphthalenes (Velsicol AR-50G).

One part butyl carbitol acetate.

One part Triton X-161 (mixture of p-octylphenol-ethylene oxide adduct containing about 16 ethylene oxide units together with a sodium alkylphenyl sulfonate).

Appropriate dilutions in water of the formulated material were applied to the plants growing in the flats. After five days observations and records were made of the effect of the test chemical on the five planted crops.

Readings were based on a 0 to 10 scale, where 0 indicates no damage or effect and 10 indicates a complete kill of all of the plants.

The post emergent herbicides of the present invention are shelf stable and nontoxic to higher forms of animal life.

Many of the compounds of the present invention were also given a secondary screening for post emergent herbicidal activity. The secondary screening was carried out exactly as in the primary testing but the tests were extended to cover cucumbers, beans, corn, cotton and alfalfa. The rates of application of active chemical in the secondary screening was 10, 5, 2 and 1 pounds per acre. In the following Table 2, the active ingredients had the following formula

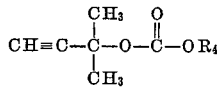

where $R_1$ is selected from the group consisting of hydrogen, lower alkyl, phenyl and tolyl; $R_2$ is selected from the group consisting of lower alkyl, lower alkenyl, phenyl, methylphenyl and chlorophenyl; $R_3$ is selected from the group consisting of lower alkyl, phenyl and $R_4$ is selected from the group consisting of lower alkyl, lower alkenyl, aryl of the phenyl series, chlorophenyl, cyclohexyl, furfuryl and tetrahydrofurfuryl.

2. A process of killing growing plants comprising applying to the growing plants a herbicidally effective amount of an acetylenic carbonate having the formula

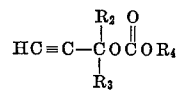

wherein $R_2$ and $R_3$ are lower alkyl and $R_4$ is lower alkyl.

3. A process according to claim 2 wherein $R_2$ and $R_3$ are methyl.

4. A process of killing growing plants comprising applying to the growing plants a herbicidally effective amount of an acetylenic carbonate having the formula

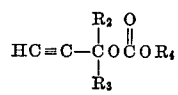

wherein $R_2$ and $R_3$ are lower alkyl and $R_4$ is aryl of the phenyl series.

TABLE 2

| R4 | Lbs./acre | Fl | SB | Ra | Wh | Oa | Cu | Be | Corn | Cot | Al |
|---|---|---|---|---|---|---|---|---|---|---|---|
| Methyl | 20 | 7 | 8 | 6 | 6 | 2 | | | | | |
|  | 5 | 8 | 2 | 5 | 0 | 0 | | | | | |
|  | 10 | 2 | 3 | 5 | 0 | 4 | 3 | 4 | 0 | 2 | 6 |
|  | 5 |  |  |  |  |  | 0 | 0 | 3 | 0 | 0 |
|  | 2 |  |  |  |  |  | 0 | 0 | 1 | 0 | 0 |
| Ethyl | 20 | 8 | 8 | 6 | 0 | 2 | | | | | |
|  | 5 | 1 | 0 | 0 | 0 | 0 | | | | | |
|  | 10 | 6 | 9 | 5 | 2 | 0 | 5 | 6 | 4 | 4 | 7 |
|  | 5 | 0 | 5 | 1 | 0 | 4 | 0 | 0 | 0 | 3 | 0 |
|  | 2 | 0 | 0 | 0 | 3 | 0 | 3 | 4 | 0 | 0 | 0 |
| Propyl | 20 | 7 | 7 | 4 | 0 | 0 | | | | | |
| N-butyl | 20 | 8 | 6 | 8 | 5 | 8 | | | | | |
|  | 10 | 5 | 10 | 7 | 4 | 4 | 6 | 4 | 6 | 6 | 8 |
|  | 5 | 2 | 3 | 3 | 3 | 0 | 0 | 0 | 0 | 0 | 0 |
|  | 2 | 0 | 0 | 0 | 0 | 0 | 0 | 3 | 0 | 0 | 0 |
|  | 1 | 0 | 0 | 0 | 0 | 5 | 0 | 0 | 5 | 0 | 0 |
| Amyl | 20 | 8 | 9 | 7 | 5 | 7 | | | | | |
|  | 10 | 5 | 5 | 0 | 0 | 4 | 5 | 4 | 3 | 4 | 8 |
|  | 5 | 6 | 9 | 6 | 0 | 5 | 4 | 4 | 0 | 3 | 0 |
|  | 1 | 0 | 2 | 0 | 2 | 4 | 0 | 3 | 4 | 0 | 0 |
| 2-ethylhexyl | 20 | 9 | 9 | 8 | 7 | 9 | | | | | |
|  | 5 | 3 | 0 | 3 | 2 | 2 | | | | | |
| Allyl | 20 | 7 | 7 | 7 | 7 | 8 | | | | | |
| Isobutyl | 20 | 6 | 9 | 7 | 8 | 4 | | | | | |
|  | 5 | 0 | 4 | 4 | 4 | 1 | | | | | |
|  | 10 | 8 | 9 | 7 | 8 | 8 | 9 | 8 | 3 | 8 | 6 |
|  | 5 | 6 | 9 | 7 | 8 | 4 | 7 | 8 | 4 | 9 | 4 |
|  | 2 | 5 | 9 | 7 | 7 | 4 | 6 | 8 | 4 | 8 | 4 |
|  | 1 | 6 | 9 | 7 | 5 | 3 | 7 | 8 | 5 | 5 | 0 |
| Phenyl | 20 | 5 | 9 | 8 | 10 | 8 | | | | | |
|  | 5 | 0 | 2 | 2 | 2 | 7 | | | | | |
|  | 10 | 6 | 9 | 5 | 6 | 8 | 6 | 9 | 8 | 7 | 7 |
|  | 5 | 2 | 5 | 5 | 4 | 7 | 6 | 8 | 6 | 6 | 3 |
|  | 2 | 3 | 5 | 4 | 5 | 7 | 6 | 9 | 7 | 7 | 4 |
|  | 1 | 3 | 4 | 4 | 3 | 6 | 6 | 6 | 4 | 6 | 1 |

It was observed that ethyl-1,1-dimethyl prop-2-yne-1-yl carbonate was highly selected for corn and that isobutyl-1,1-dimethyl prop-2-yne-yl carbonate at 1 lb./acre killed everything other than cotton. This selective herbicide activity can be taken advantage of, for example, to kill all other plants growing in a cotton patch while leaving the cotton unimpaired.

What is claimed is:

1. A process of killing growing plants comprising applying to the growing plants a herbicidally effective amount of an acetylenic carbonate having the formula

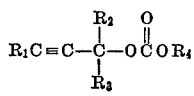

5. A process according to claim 4 wherein $R_2$ and $R_3$ are methyl and $R_4$ is phenyl.

6. A process of killing weeds growing in a cotton patch comprising applying to the growing weeds an amount of isobutyl-1,1-dimethyl prop-2-yne-1-yl carbonate effective to kill the weeds but insufficient to kill the cotton.

References Cited

UNITED STATES PATENTS 2,603,560  7/1952  Stewart _____ 71—2.7 X
2,885,278  5/1959  Brack _____ 71—2.6

LEWIS GOTTS, *Primary Examiner.*

JAMES O. THOMAS, *Examiner.*